United States Patent Office 3,351,659
Patented Nov. 7, 1967

3,351,659
AMINOBENZAMIDES
Arthur A. Santilli, Havertown, Pa., and Thomas S. Osdene, Richmond, Va., assignors to American Home Products Corporation, New York, N.Y., a corporation of Delaware
No Drawing. Filed Oct. 12, 1966, Ser. No. 586,055
9 Claims. (Cl. 260—558)

ABSTRACT OF THE DISCLOSURE

This invention relates to aminobenzamides, in particular, 2-(lower)alkylaminobenzamides and 2-amino-N-[2-hydroxy(lower)alkyl] benzamides which are useful as intermediates in the synthesis of therapeutically active benzothiadiazinone oxides and N-[o-(oxazolin-2-yl)phenyl]alkyl or aryl sulfonamides.

---

This invention is a continuation-in-part of United States patent application, Serial Number 434,160, filed on January 15, 1965, and now abandoned which was a divisional application of United States patent application, Serial Number 303,155, filed August 19, 1963, which issued as U.S. 3,217,001 on November 9, 1965. This invention is also a continuation-in-part of co-pending United States patent application Serial Number 437,262, filed on March 4, 1965 and now abandoned, which latter application is a continuation-in-part of United States patent application, Serial Number 330,251, filed on December 13, 1963 and is now abandoned.

This invention is concerned with new and novel aminobenzamides. In particular, the present invention is concerned with 2-(lower)alkylaminobenzamides and 2-amino-N-[2-hydroxy(lower)alkyl]benzamides which are useful as intermediates in the synthesis of therapeutically active compounds.

The novel compounds which are included within the scope of this invention are represented by the following formulae:

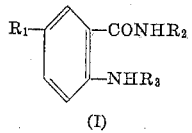

and 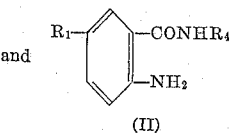

wherein $R_1$ is selected from the group consisting of hydrogen and chloro; $R_2$ is selected from the group consisting of chlorobenzyl, hydroxy(lower)alkyl, lower alkoxy(lower)alkyl, phen(lower)alkyl, and cyclo(lower)alkyl; $R_3$ is lower alkyl; and $R_4$ is selected from the group consisting of 2-hydroxy-phenethyl, 2-hydroxy(lower)alkyl, and chloro-2-hydroxy-phenethyl. Examples of such compounds include: 2-amino-5-chloro-N-(2-hydroxyphenethyl)benzamide; 2-amino-5-chloro-N-(2-hydroxypropyl)benzamide; 5-chloro-N-(o-chlorobenzyl)-2-methylaminobenzamide; and 5-chloro-N-(2-ethoxyethyl)-2-methylaminobenzamide.

The 2-(lower)alkylaminobenzamides (I) of the present invention may be prepared by amidating, in an aqueous or alcoholic solvent or in a mixture of such solvents, a N-(lower)alkyl isatoic anhydride of the formula:

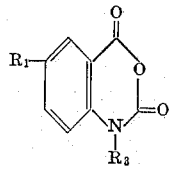

where $R_1$ and $R_3$ are defined as above, with a primary amine of the formula $R_2NH_2$, where $R_2$ is also as above defined.

This reaction is conducted at about steam bath temperatures until evolution of carbon dioxide ceases. When the reaction is complete, the reaction mixture is cooled and the resulting 2-(lower)alkylaminobenzamide (I) is obtained by conventional methods, such as, concentration or filtration and then recrystallization from a suitable solvent, e.g. benzene, an alkanol, cyclohexane and toluene.

The 2-amino-N-[2-hydroxy(lower)alkyl]benzamides (II) of the present invention may be prepared as illustrated in the following reaction scheme:

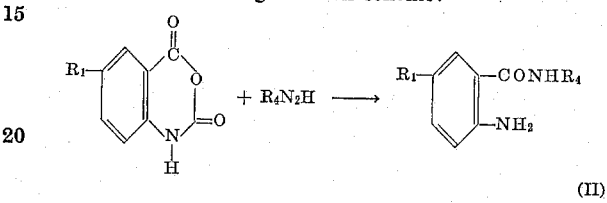

wherein $R_1$ and $R_4$ are defined as above. This reaction is effected by contacting approximately equimolar amounts of an appropriate isatoic anhydride with a primary amine in a lower alkanol solvent (e.g. ethanol) at about steam bath temperatures for a period of about five to about fifteen minutes. When the reaction is complete, the resulting 2-amino-N-[2-hydroxy(lower)alkyl]benzamide (II) is separated by standard recovery procedures, such as, concentration, crystallization and recrystallization from an appropriate solvent, e.g. benzene, and benzene-cyclohexane mixtures.

The time and temperature ranges described for the aforesaid processes are not critical and simply represent the most convenient ranges consistent with carrying out the reaction in a minimum of time without undue difficulty. Thus, reaction temperatures appreciably below steam bath temperatures can be used, but their use considerably extends the reaction time. Similarly, reaction temperatures higher than steam bath temperatures can be employed with a concomitant decrease in reaction time. The amount of solvent used in the aforesaid reactions is not critical, it being only necessary to use a sufficient amount of solvent to provide a reaction medium for the particular reactants.

Many of the reactants employed in the above described processes to prepare the compounds of the present invention are known compounds which are readily available from commercial sources, while the remainder can easily be prepared in accordance with standard organic procedures well known to those skilled in the art of chemistry. A procedure for the synthesis of o-chloro-β-hydroxyphenethylamine, a reactant employed to prepare some of the compounds of this invention, is specifically described in Example IX.

In accord with the present invention the 2-(lower)alkylaminobenzamides (I) herein described have been found to have utility as valuable intermediates in a novel process for the synthesis of pharmacologically active 1H-2,1,3-benzothiadiazin-4(3H)-one 2-oxides. The process in which the 2-(lower)alkylaminobenzamides (I) are utilized is disclosed in U.S. 3,217,001 which issued on Nov. 9, 1965, and is a parent application of the present continuation-in-part application.

In further accord with the present invention, the 2-amino-N-[2-hydroxy(lower)alkyl]benzamides (II) herein described have been found to have utility as valuable intermediates in a process for the synthesis of therapeutically active N-[o-(oxazolin-2-yl)phenyl]alkyl or aryl sulfonamides. These latter compounds have demonstrated, in standard pharmacological tests, anti-depressant, anti-convulsant, anti-tremorine and analgesic activities. When these N-[o-(2-oxazolin-2-yl)phenyl]alkyl or aryl sulfonamide compounds are employed as therapeutic agents, they are administered orally and parenterally at a dosage level that is in the range from about 10 mg. to about 400 mg. per day which dosage may be administered alone or in combination with pharmaceutically acceptable carriers, the proportion of which is determined by the solubility and chemical nature of the compound, chosen route of administration and standard pharmaceutical practice. The process in which the 2-amino-N-[2-hydroxy(lower)alkyl]benzamides (II) are utilized is described in co-pending United States patent application, Serial No. 437,262 which is a parent application of the present continuation-in-part application. Therein it is demonstrated that a 2-amino-N-[2-hydroxy(lower)alkyl] benzamide (II) is reacted with an appropriate alkyl or aryl sulfonyl chloride in dry pyridine at temperatures below 20° C. for a period of about twelve to about sixteen hours (overnight). Thereafter, the resulting N-[o-(2-oxazolin-2-yl)phenyl]alkyl or aryl sulfonamide is separated by routine recovery procedures well known to those skilled in the art of chemistry, for example, filtration or crystallization and recrystallization from a suitable solvent.

Still further, in accord with the present invention, the 2-(lower)alkylaminobenzamides (I) and the 2-amino-N-[2-hydroxy(lower)alkyl]benzamides (II) of this invention have also been found to possess interesting pharmaceutical properties which also render them useful as synthetic medicinals. More particularly, in standard pharmacological tests, these compounds have been found to have utility as anti-depressants, anti-convulsants, anti-tremorines and analgesics.

When these 2-(lower)alkylaminobenzamides (I) and 2-amino-N-[2-hydroxy(lower)alkyl]benzamides (II) are employed as anti-depressants, anti-convulsants, anti-tremorines and analgesics, they may be administered alone or in combination with pharmaceutically acceptable carriers, the proportion of which is determined by the solubility and chemical nature of the compound, chosen route of administration and standard pharmaceutical practice. For example, they may be administered orally in the form of tablets or capsules containing such excipients as starch, milk sugar, certain types of clay and so forth. They may be administered sublingually in the form of troches or lozenges in which the active ingredient is mixed with sugar and corn syrups, flavoring agents and dyes; and then dehydrated sufficiently to make it suitable for pressing into a solid form. They may be administered orally in the form of solutions which may contain coloring and flavoring agents or they may be injected parenterally, that is intramuscularly, intravenously or subcutaneously. For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects and preferably at a level that is in the range of from about 10 mg. to about 400 mg. per day, although as aforementioned variations will occur. However, a dosage level that is in the range of from about 50 mg. to about 200 mg. per day is most desirably employed in order to achieve effective results.

The following examples are given by way of illustration and are not to be construed as limitations of this invention, many variations of which are possible without departing from the scope and spirit thereof.

EXAMPLE I

To a solution of 3.1 g. of ethanolamine in 40 ml. of ethanol, there is added 10.5 g. of 5-chloro-N-methylisatoic anhydride. The reaction mixture is warmed for a few minutes on the steam bath. After the evolution of carbon dioxide is complete, the solvent is removed on a rotary evaporator. The oily residue crystallizes to a solid mass on cooling and amounts to 6.7 g., M.P. 116–122° C. Recrystallization from benzene affords 5-chloro-N-(2-hydroxyethyl) - 2 - methylaminobenzamide, M.P. 125.5–129° C.

Analysis for $C_{10}H_{13}N_2O_2Cl$: Calcd. C, 52.53; H, 5.73; N, 12.25; Cl, 15.51. Found C, 52.60; H, 5.51; N, 12.53; Cl, 15.51.

When tested pharmacologically, the above prepared 5-chloro-N-(2-hydroxyethyl)-2-methylaminobenzamide exhibited analgesic, diuretic, anticonvulsant, and anti-tremorine activities.

In a similar manner, 5-chloro-N-methylisatoic anhydride is reacted with propanolamine to afford 5-chloro-N-(3-hydroxyethyl)-2-methylaminobenzamide.

EXAMPLE II

To a solution of 7.1 g. of o-chlorobenzylamine in 50 ml. of ethanol, there is added 11.5 g. of 5-chloro-N-methylisatoic anhydride. The reaction mixture is heated on the steam bath until the evolution of carbon dioxide ceases, and complete dissolution of solids is attained. The reaction mixture is filtered. A white crystalline product is deposited out of solution which amounts to 9.9 g., M.P. 133–6° C. Recrystallization of the product from ethanol affords 5-chloro-N-(o-chlorobenzyl)-2-methylaminobenzamide, M.P. 137.5–139° C.

Analysis for $C_{15}H_{14}N_2OCl_2$: Calcd. C, 58.27; H, 4.56; N, 9.06; Cl, 22.93. Found C, 58.54; H, 4.41; N, 8.77; Cl, 22.5.

Similarly, 5-chloro-N-ethylisatoic anhydride is reacted with o-chlorobenzylamine to afford 5-chloro-N-(o-chlorobenzyl)2-ethylaminobenzamide.

EXAMPLE III

To a solution of 4.5 g. of 2-ethoxyethylamine in 50 ml. of ethanol, there is added 11.5 g. of 5-chloro-N-methylisatoic anhydride. After the evolution of carbon dioxide has abated, the reaction mixture is heated for an additional five minutes on a steam bath. The solvent is removed on a rotary evaporator. The residual oil crystallizes on standing in a cold room. The product, which amounts to 13.0 g., M.P. 50–63° C., is recrystallized from cyclohexane affording 5 - chloro-N - (2-ethoxyethyl)-2-methylaminobenzamide, M.P. 73.4° C.

Analysis for $C_{12}H_{17}N_2O_2Cl$: Calcd. C, 56.14; H, 6.67; N, 10.91; Cl, 13.81. Found C, 55.90; H, 6.47; N, 11.05; Cl, 13.86.

When tested pharmacologically, this compound exhibits analgesic, anticonvulsant and central nervous system depressant activities.

Similarly, 5 - chloro - N-(3-methoxypropyl)-2-methylaminobenzamide and 5-chloro - N - (2-methoxyethyl)-2-methylaminobenzamide are produced.

EXAMPLE IV

To a solution of 9.68 g. of phenethylamine in 50 ml. of ethanol, there is added 15.9 g. of 5-chloro-N-methylisatoic anhydride. A brisk evolution of carbon dioxide occurs after warming for a few minutes on a steam bath.

When gas evolution has abated, the reaction mixture is heated to reflux until dissolution of the solids occurs and the reaction mixture is filtered. A white crystalline product is deposited out of solution which upon removal amounts to 16.0 g., M.P. 126–131° C. The product is recrystallized from ethanol affording 5-chloro-2-methylamino-N-phenethylbenzamide, M.P. 132–134° C.

Analysis for $C_{16}H_{17}N_2OCl$: Calcd. C, 66.54; H, 5.93; N, 9.70; Cl, 12.27. Found C, 66.41; H, 5.90; N, 9.73; Cl, 12.3.

In the same manner, N-methylisatoic anhydride is reacted with benzylamine to synthesize N-benzyl-2-methylaminobenzamide.

EXAMPLE V

To a solution of 6.4 g. of cyclopentylamine in 40 ml. of ethanol, there is added 15.9 g. of 5-chloro-N-methylisatoic anhydride. The reaction mixture is heated for a few minutes on the steam bath until the evolution of carbon dioxide is complete. The solvent is removed on the rotary evaporator and the solid residue amounts to 16.5 g., M.P. 59–85° C. Recrystallization of the product from cyclohexane affords 5 - chloro - N-cyclopentyl-2-methylaminobenzamide, M.P. 153–155° C.

Analysis for $C_{13}H_{17}N_2OCl$: Calcd. C, 61.77; H, 6.78; N, 11.08; Cl, 14.03. Found C, 61.50; H, 6.74; N, 11.36; Cl, 13.9.

In the same manner, reacting the following cycloalkylamines and isatoic anhydride the hereinafter listed products are obtained:

| Reactants | Products |
| --- | --- |
| Cyclohexylamine and 5 - chloro-N-methylisatoic anhydride. | 5-chloro-N-cyclohexyl-2-methylaminobenzamide. |
| Cyclopropylamine and N - ethylisatoic anhydride. | N-cyclopropyl-2-ethylaminobenzamide. |
| Cycloheptylamine and N - methylisatoic anhydride. | N-cycloheptyl-2-methylaminobenzamide. |

EXAMPLE VI

To a solution of 8.6 g. of o-chlorobenzylamine in 40 ml. of ethanol, there is added 10.6 g. of N-methylisatoic anhydride. The reaction mixture is heated on a steam bath for fifteen minutes and then filtered. A white crystalline product precipitates (12.7 g., M.P. 132–133° C.) which is recrystallized from ethanol to afford N-(o-chlorobenzyl)-2-methylaminobenzamide, M.P. 133–134° C.

Analysis for $C_{15}H_{15}N_2Cl$: Calcd. C, 65.58; H, 5.50; N, 10.20; Cl. 12.91. Found C, 65.26; H, 5.43; N, 10.20; Cl, 13.0.

When tested pharmacologically, this compound exhibits analgesic activity.

EXAMPLE VII 5-chloroisatoic anhydride (9.9 g.) is added to a solution of 6.9 g. of β-hydroxyphenethylamine in 20 ml. of ethanol. The reaction mixture is heated on the steam bath for several minutes and then allowed to stand overnight at room temperature. The solvent is removed in a rotary evaporator and the oily residue allowed to crystallize on cooling. Recrystallization from benzene affords 2 - amino-5-chloro-N-(β-hydroxyphenethyl)benzamide, M.P. 119–121° C.

Analysis for $C_{15}H_{15}N_2O_2Cl$: Calcd. C, 61.96; H, 5.20; N, 9.64; Cl, 12.19. Found C, 62.02; H, 5.24; N, 9.38; Cl, 12.07.

EXAMPLE VIII 5-chloroisatoic anhydride (19.7 g.) is added to a solution of 7.5 g. of 1-amino-2-propanol in 50 ml. of ethanol. The reaction mixture is then heated for five minutes on the steam bath. The solvent is removed on a rotary evaporator and crystallization of the oily residue is induced by cooling and scratching. Recrystallization from benzene affords 2-amino-5-chloro-N-(2-hydroxypropyl)benzamide, M.P. 109–110.5° C.

Analysis for $C_{10}H_{13}N_2O_2Cl$: Calcd. C, 52.52; H, 5.73; N, 12.25; Cl, 15.50. Found C, 52.72; H, 5.89, N, 12.29; Cl, 15.50.

In a similar manner, 5-chloroisatoic anhydride is reacted with 1-amino-2-butanol to afford 2-amino-N-(2-hydroxybutyl)benzamide.

EXAMPLE IX

To a cooled and stirred suspension of 37.8 g. of lithium aluminum hydride in 800 ml. of anhydrous tetrahydrofuran, there is added dropwise 107 g. of o-chloromandelonitrile acetate. The reaction mixture is allowed to warm up to room temperature and is then boiled under reflux for two hours. Thereafter, the reaction mixture is cooled in ice and 100 ml. of water added dropwise, followed by 200 ml. of 20% sodium hydroxide. After the reaction mixture is allowed to stand overnight, it is filtered. The solvent is removed on a rotary evaporator and the residue distilled in vacuo to yield 56 g. of o-chloro - β - hydroxyphenethylamine, B.P. 108–112° C. (0.25 mm.).

To a solution of the above prepared o-chloro-β-hydroxyphenethylamine (19.7 g.) in 50 ml. of ethanol, there is added 19.7 g. of 5-chloroisatoic anhydride. Thereafter, the reaction mixture is heated on a steam bath for fifteen minutes and then filtered. The solvent is removed on a rotary evaporator and the gummy residue washed with cyclohexane and benzene. Recrystallization from a benzene-cyclohexane mixture yields 2-amino - 5 - chloro - N-(o-chloro-β-hydroxyphenethyl)benzamide, M.P. 105–107° C.

Analysis for $C_{15}H_{14}N_2Cl_2O_2$: Calcd. C, 55.40; H, 4.34; N, 8.62; Cl, 21.80. Found C, 55.71; H, 4.25; N, 8.38; Cl, 21.50.

EXAMPLE X

To 18.8 g. of o-chloro-β-hydroxyphenethylamine, as prepared in Example IX, in 50 ml. of ethanol there is added 16.3 g. of isatoic anhydride. Thereafter, the reaction mixture is heated for fifteen minutes on a steam bath, filtered and the solvent removed on a rotary evaporator. Crystallization of the oily residue is induced by cooling and scratching the sides of the vessel. Recrystallization from a mixture of benzene and cyclohexane affords a product weighing 17.5 g., M.P. 93–100° C. A second recrystallization from benzene-cyclohexane yields 2 - amino - N - (o-chloro-β-hydroxyphenethyl)benzamide, M.P. 103–105° C.

Analysis for $C_{15}H_{15}N_2O_2Cl$: Calcd. C, 61.97; H, 5.20; N, 9.63; Cl, 12.19. Found C, 62.22; H, 5.00; N, 9.34; Cl, 11.6.

EXAMPLE XI

To a solution of 4.0 g. of ethanolamine in 50 ml. of water, there is added 9.85 g. of 5-chloroisatoic anhydride. After the reaction mixture is heated for twenty minutes on a steam bath, the product is separated and recrystallized from water to afford 2-amino-N-(2-hydroxyethyl)-5-chlorobenzamide, M.P. 121–122.5° C.

Analysis for $C_9H_{11}N_2O_2Cl$: Calcd. C, 50.36; H, 5.16; N, 13.05; Cl, 16.52. Found C, 50.25; H, 5.25; N, 13.05; Cl, 16.50.

In a similar manner, ethanolamine is reacted with isatoic anhydride to afford 2-amino-N-(2-hydroxyethyl)benzamide.

What is claimed is:
1. A compound selected from the group consisting of those having the formula:

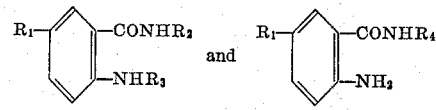

wherein $R_1$ is selected from the group consisting of hydrogen and chloro; $R_2$ is selected from the group consisting of chlorobenzyl, lower alkoxy(lower)alkyl, phen(lower)alkyl, and cyclo(lower)alkyl with the proviso that when $R_2$ is phen(lower)alkyl and cyclo(lower)alkyl $R_1$ is chloro; $R_3$ is lower alkyl; and $R_4$ is selected from the group consisting of β-hydroxyphenethyl and chloro-β-hydroxyphenethyl.

2. A compound as described in claim 1 which is: 5-chloro-N-(o-chlorobenzyl)-2-methylaminobenzamide.

3. A compound as described in claim 1 which is: 5-chloro-N-(2-ethoxyethyl)-2-methylaminobenzamide.

4. A compound as described in claim 1 which is: 5-chloro-2-methylamino-N-phenethylbenzamide.

5. A compound as described in claim 1 which is: 5-chloro-N-cyclopentyl-2-methylaminobenzamide.

6. A compound as described in claim 1 which is: N-(o-chlorobenzyl)-2-methylaminobenzamide.

7. A compound as described in claim 1 which is: 2-amino-5-chloro-N-(β-hydroxyphenethyl)benzamide.

8. A compound as described in claim 1 which is: 2-amino-5-chloro-N-(o-chloro-β-hydroxyphenethyl)benzamide.

9. A compound as described in claim 1 which is: 2-amino-N-(o-chloro-β-hydroxyphenethyl)benzamide.

References Cited

Clark et al., Jour. Org. Chem., vol. 9, pages 55–63 relied on (1944).

Petyunin et al., Zhurnal Obschchei Khimii, vol. 30, pages 2453–7 (1960).

Shridhar et al., Jour. Indian Chem. Soc., vol. 33, pages 305–12 (1956).

Singh et al., Jour. Indian Chem. Soc., vol. 40, pages 545–9 (July 1963).

JOHN D. RANDOLPH, *Primary Examiner.*

WALTER A. MODANCE, *Examiner.*

N. TROUSOF, *Assistant Examiner.*